United States Patent
Hutchinson

(10) Patent No.: US 11,911,967 B2
(45) Date of Patent: Feb. 27, 2024

(54) SELF-MODIFYING APPARATUS FOR ROTATIONAL SUPPORT STRUCTURE REMOVAL IN 3D PRINTED PARTS USING CALIBRATED RESONANT FREQUENCY

(71) Applicant: PostProcess Technologies, Inc., Buffalo, NY (US)

(72) Inventor: Daniel Joshua Hutchinson, Buffalo, NY (US)

(73) Assignee: PostProcess Technologies, Inc., Buffalo, NY (US)

( * ) Notice: Subject to any disclaimer, the term of this patent is extended or adjusted under 35 U.S.C. 154(b) by 362 days.

(21) Appl. No.: 17/458,115

(22) Filed: Aug. 26, 2021

(65) Prior Publication Data

US 2022/0032544 A1    Feb. 3, 2022

Related U.S. Application Data

(62) Division of application No. 16/348,276, filed as application No. PCT/US2017/061880 on Nov. 15, 2017, now Pat. No. 11,110,661.

(60) Provisional application No. 62/422,198, filed on Nov. 15, 2016.

(51) Int. Cl.
  *B29C 64/35*    (2017.01)
  *B08B 3/12*     (2006.01)
  *B33Y 40/20*    (2020.01)

(52) U.S. Cl.
  CPC ............... *B29C 64/35* (2017.08); *B08B 3/12* (2013.01); *B33Y 40/20* (2020.01)

(58) Field of Classification Search
  None
  See application file for complete search history.

(56) References Cited

U.S. PATENT DOCUMENTS

| | | |
|---|---|---|
| 3,564,775 A | 2/1971 | Bodine |
| 4,716,684 A | 1/1988 | Roach |
| 6,519,500 B1 | 2/2003 | White |
| 8,531,915 B2 | 9/2013 | Ammar |
| 8,828,311 B2 | 9/2014 | Medina et al. |
| 2004/0238481 A1 | 12/2004 | Wang et al. |
| 2005/0033478 A1 | 2/2005 | Hunter et al. |
| 2010/0022074 A1 | 1/2010 | Wang et al. |
| 2015/0035200 A1 | 2/2015 | Karpas et al. |
| 2015/0239021 A1 | 8/2015 | Ponomarev |
| 2016/0074940 A1 | 3/2016 | Cote et al. |
| 2016/0288420 A1 | 10/2016 | Anderson, Jr. et al. |

(Continued)

FOREIGN PATENT DOCUMENTS

WO    2016/094827 A1    6/2016

*Primary Examiner* — Rita P Adhlakha
(74) *Attorney, Agent, or Firm* — Lempia Summerfield Katz LLC

(57) ABSTRACT

A process for removing support material from a part made by an additive manufacturing process is disclosed. The part may be arranged in a media filled tank. Ultrasonic waves are directed for the part and/or support material. Ultrasonic waves from an ultrasonic transducer are applied to a part or support material and cause the part to vibrate. The frequency of the ultrasonic energy may be tuned to cause the part and/or the support material to vibrate at its resonant frequency. The support material may have different properties, such as density, geometry, material, or porosity. Such differences may allow the support material to resonate in response to the applied ultrasonic energy waves at a different ultrasonic frequency than, the part itself.

20 Claims, 6 Drawing Sheets

(56) References Cited

U.S. PATENT DOCUMENTS

| | | |
|---|---|---|
| 2017/0173692 A1 | 6/2017 | Myerberg et al. |
| 2018/0009007 A1 | 1/2018 | Craft et al. |
| 2019/0022931 A1 | 1/2019 | Hutchinson |
| 2019/0270248 A1 | 9/2019 | Hutchinson |
| 2019/0315065 A1 | 10/2019 | Hutchinson |

SELF-MODIFYING APPARATUS FOR ROTATIONAL SUPPORT STRUCTURE REMOVAL IN 3D PRINTED PARTS USING CALIBRATED RESONANT FREQUENCY

CROSS-REFERENCE TO RELATED APPLICATIONS

This application is a divisional of U.S. patent application Ser. No. 16/348,276, filed May 8, 2019, now U.S. Pat. No. 11,110,661, which is a National Phase of International Application No. PCT/US17/61880, filed Nov. 15, 2017, which claims the benefit of U.S. Provisional Patent Application No. 62/422,198, filed Nov. 15, 2016, which applications are incorporated herein by reference in their entirety.

FIELD OF THE INVENTION

This invention relates generally to a method and apparatus for removing support material from parts made by additive manufacturing techniques such as 3D printing, and, more specifically, to a method and apparatus for removing support material using longitudinal waves at ultrasonic frequencies.

BACKGROUND OF THE INVENTION

Additive manufacturing processes (a.k.a. 3D printing) such as Selective Laser Sintering (SLS) have enabled the production of parts having complex geometries which would never be possible through traditional manufacturing techniques, such as casting, injection molding, or forging. During the printing process, support material is needed to support portions of the part as the part is being printed. After the printing process is completed, the support material is no longer needed, and must be removed. Removing the support material can require significant efforts.

The support material itself can have a complex geometry and can also be extensive, since it may support the part at a plurality of locations. Additionally, since additive manufacturing prints a part in discrete layers, the surface finish of a part is rough since edges of the layers do not always align with each other, thus creating a rough, bumpy outer surface. This outer surface is not only unappealing from a visual standpoint, but also can create stress concentrations, which could develop during testing or use of the part and thus lead to a pre-mature failure.

A current solution in the additive manufacturing industry is to manually remove the support material in order to produce a smooth exterior surface of the part. Depending on the type of part printed, using manual labor could be cost prohibitive, and if not cost prohibitive could lead to excessive removal of material, or an uneven surface, or both. If a surface is finished unevenly, stress concentrations could still exist, leading to pre-mature failure. Even further, manual removal of unwanted support material and surface finishing lacks the ability to be consistent over an extended period of time. And, such manual removal may create a bottleneck in the production process since one technician can remove support material from a small number of parts at a time.

Another solution which the additive manufacturing industry is moving towards is using an automated machine, such as those providing a chemical bath, to remove support material and to perform surface finishing. However, these machines are limited in the type of process parameters, such as temperature, agitation level, fluid flow level, that can be altered. They also require operation by a technician, which does not completely eliminate the bottleneck issue described above. Additionally, if a technician is unaware that a machine is not set at the proper parameters, excessive material removal could occur, thereby ruining the part.

As the additive manufacturing industry evolves, new materials are being utilized. At the start of additive manufacturing, additive manufacturing processes were limited to making plastic parts due to the ability of plastic to be manipulated with minimal heat and pressure. But as additive manufacturing evolved, the desire for more robust and durable materials also evolved. Currently, additive manufacturing processes exist which will produce metal parts, and these metal parts are not only suitable as prototypes, but also may be fully functional and market-ready. Even though previous methods of support material removal and surface finishing were plausible with parts made from plastic, such as applying abrasive material, chemical dissolution, and/or applying high temperature, the energy required to remove support material and perform surface finishing on metal parts is significantly greater.

Ultrasound has been used to facilitate the removal of unwanted support material, which is sometimes referred to as "cleaning". Attempts at developing machines to utilize ultrasonic frequencies to remove unwanted support material include that disclosed in U.S. Pat. No. 9,610,617 (Goodson), which describes an apparatus that uses ultrasonic transducers to generate cavitation in a fluid in order to remove unwanted support material. Goodson uses a plurality of different transducers mounted to a plate secured to a cleaning tank. However, Goodson does not disclose a means for sensing the frequency and amplitude of the part being cleaned when ultrasonic vibrations are applied to a part within the cleaning tank, or altering the amplitude or frequency applied to the part across a plurality of time intervals. This means that the part contained within the cleaning tank could be destroyed due to excessive cavitation if an operator is not monitoring the part closely.

Thus, there has been a long-felt need for a method and apparatus for automatically removing support material from parts arising additive manufacturing techniques.

SUMMARY OF THE INVENTION

The present disclosure describes methods for removing support material from parts arising from an additive manufacturing process, such as 3D-printing. In these methods, longitudinal waves at an ultrasonic frequency are used. In an example embodiment, the additive manufactured part and the support structure connected to that part comprise a single material, since both are made together. However, although the part and support structure may be comprised of the same material, each portion may resonate at different frequencies due to differences in density, geometry, and/or porosity. In a process described in the present disclosure, an ultrasonic frequency feedback sensor (UFFS), which may be an ultrasonic frequency cavitation sensor (UFCS), detects resonance of a part having support material after ultrasonic energy in the form of longitudinal waves is applied to the part by an ultrasonic transducer.

The UFFS measures the response of the part and support material to the applied ultrasonic longitudinal waves. In response to the measurements made by the UFFS, a method according to the invention may alter the frequency generated by the ultrasonic transducer in order to match the resonant frequency of the support material. This calibrated tuning process allows for greater efficiency in support removal, particularly for metal parts comprised of a single material where the overall density, geometry, or porosity of the support material differs from the density, geometry, or porosity of the part.

Differences in the overall density, geometry, material, or porosity of the support material versus the part can be caused by the manufacturing process, such as laser sintering of the support material. For example, laser sintering processes allow for the creation of a joining section arranged between the part and support material, and that joining section can be designed to have properties that are exploitable in the support material removal process. The support material and the part may be comprised of the same material, and may have the same density prior to the additive manufacturing process. However, after sintering, the support material and part may have different densities because the sintering alters the density, geometry, and/or porosity at particular regions of the support material. This difference in density, geometry, and/or porosity created by the sintering process can be exploited, particularly at the area where of the support material joins to the part. This difference in density, geometry, or porosity may carry with it a difference in the ultrasonic frequency at which the sintered portion of the support material resonates. The process described in the present disclosure could also be used with multiple metal materials (e.g., composites or super alloys), and used independently or in combination with additional methods of support removal, such as chemical dissolution.

As the support material is removed, its resonant frequency may change. In an embodiment of the invention, the frequency of the ultrasonic energy emitted by the ultrasonic transducer may be adjusted from time to time to match the resonant frequency of the support material. The ultrasonic transducer that generates the ultrasonic energy may be a piezo-electric, ultrasonic, mechanical device, or any suitable device capable of producing ultrasonic vibrations.

In a process described in the present disclosure, an additive manufactured part having support material, which is sometimes referred to herein as an "AMPHSM", may be placed in a tank (sometimes referred to herein as a "chamber") with a liquid detergent. Initial media parameters within the tank, including but not limited to temperature and pH, may be characterized and used to select an amplitude and frequency of the ultrasonic waves emanating from the ultrasonic transducer. Such initial media parameters may be based on operator experiences, design data, general thermal principles, and periodic testing. For example, a solid or dense object may require a greater initial heating time than a hollow object. Initial settings may be predicted based on previous experience with similar objects, where the operator may be a person or a computer program.

Values are then generated and used to control pumping of media so that a vortex is created in the media that surrounds the AMPHSM. For example, a run time value of the pumping is determined through a process which may include use of a database having information about prior calibration runs and comparing such calibration runs to the AMPHSM parameters, such as density, material, geometry, and porosity. For example, if a part has a large density or print volume, the initial run time value might be larger than a smaller part to allow the ultrasonic process to have a greater impact on the support material. Once the pump begins moving the media, the AMPHSM is rotated and agitated. Multiple means of agitation may be applied to the AMPHSM simultaneously. Ultrasonic waves may be one of these means of agitation. The resonant frequency of the support structure may be measured by the UFFS. Based on those measurements, the frequency of the ultrasonic transducer may be selected so that the support material vibrates at or near its resonant frequency in order to maximize efficient use of energy.

The media in which the AMPHSM resides may be contained within a chamber. If the chamber only contained liquid media, the vibrations at which the liquid media is vibrating would be detected by the UFFS, and be sustainably similar to the vibrations imparted by the ultrasonic transducer. Once an AMPHSM is placed within the media, the vibrations at which the liquid media is vibrating will be altered due to the presence of the AMPHSM within the liquid. This difference in vibration can be used to determine if support material is vibrating at resonant frequency. For example, the ultrasonic transducer will vibrate the media at a first frequency level and a first amplitude level over a first time interval. During the first time interval, the vibrations detected by the UFFS, which are sometimes referred to herein as "feedback vibrations", including the frequency and amplitude of the vibrations, from the support material will be measured by the UFFS. After the first time interval ends, the ultrasonic transducer will be instructed to vibrate the media at a second frequency level and a second amplitude level over a second time interval. During the second time interval, the feedback vibrations, including the frequency and amplitude of the vibrations, from the support material will be measured by the UFFS. Then, the measured amplitude from the first time interval is compared to the measured amplitude from the second time interval. If the second time interval amplitude is larger than the first time interval amplitude, then the frequency of the waves emanating from the ultrasonic transducer will be altered in the same direction (up or down) for a third time interval. The increase in amplitude signals that the imparted frequency level from the ultrasonic transducer is approaching the resonant frequency of the support material. However, if the second time interval amplitude is less than the first time interval amplitude, then the frequency of the waves emanating from the ultrasonic transducer will be altered in a different direction for the third time interval.

The UFFS and the ultrasonic transducer are similar devices which deal with the relationship between longitudinal ultrasonic waves and electrical signals. As used herein, an ultrasonic transducer turns electrical signals into a longitudinal ultrasonic wave in a fluid, and a UFFS converts a longitudinal ultrasonic wave in a fluid to an electrical signal, which may be provided to and interpreted by a computer.

Additionally, the present disclosure broadly describes a method of removing support material that includes placing an AMPHSM within a chamber, the chamber having a media arranged within, inputting a first density, geometry, material, or porosity of the support material into a control unit, measuring a set of media parameters, including temperature, and/or pH of the media, via sensors communicatively connected with the control unit, providing the media parameters to the control unit, selecting operating parameters, activating a pump according to the operating parameters to create flow of the media within the chamber to suspend the AMPHSM in the moving media, agitating the media and the AMPHSM, at a first agitation level via an ultrasonic transducer, measuring a feedback amplitude at which the AMPHSM vibrate corresponding to the first agitation level via a UFFS, analyzing the measured feedback amplitude to determine if the support material is vibrating at a resonant frequency due to the first agitation level, agitating the media and the AMPHSM suspended in the media at a second agitation level via the ultrasonic transducer if the support material is not vibrating at the resonate frequency from the first agitation level, repeating the steps of agitating said media, measuring the feedback amplitude, and analyzing the feedback amplitude at the second agitation level until a resonant agitation level which vibrates the support material at the resonant frequency is determined, agitating the media and the AMPHSM suspended in the media at the resonant agitation level to remove support material from the part, and removing the part from the chamber after a desired amount of support material is removed from the part.

Moreover, the present disclosure broadly describes a method of removing support material including placing an AMPHSM within a chamber, the chamber having a media arranged within, generating a run time value for a pump that circulates the media, activating the pump, wherein the AMPHSM begins to rotate within the chamber due to the flow of the media, agitating the media and the AMPHSM at a first agitation frequency set at a value, measuring a first amplitude of the vibrations generated by the AMPHSM due to the agitation of the media and the AMPHSM via a sensor, calculating a second agitation frequency based on the measurement of the first amplitude, wherein the media and the AMPHSM are agitated at the second agitation frequency, measuring a second amplitude, the second agitation frequency being a resonant frequency of the support material, repeating the steps of agitating said media, measuring the amplitude, and calculating a new agitation frequency based on the measurement over a plurality of time intervals, wherein an amount of the support material is removed over each of the time intervals, and removal of the support material changes the resonant frequency of the support material, and removing the part from the chamber after a desired amount of support material is removed from the part.

The initial agitation frequency may be determined by using a database having information about prior calibration runs, and comparing such information about prior calibration runs to parameters corresponding to the AMPHSM, such as density, material, geometry, and porosity. For example, if a part has a large density or a geometry including thicker components, the initial agitation frequency would be larger than a smaller part having a hollow geometry since it can be determined that a low agitation frequency and amplitude would be ineffective at vibrating the support material.

In order to determine if the support material is vibrating at a resonant frequency, the UFFS reads in the amplitude and frequency of the support material which is vibrating within the media. If the support material is vibrating at resonant frequency, the amplitude of the vibration from said support material will increase without changing the intensity of the frequency applied to the support material by the ultrasonic transducer. If the feedback vibrations of the support material are not increasing in amplitude, then the altering of the imparted frequency by the ultrasonic transducer will increase or decrease along a frequency level range. If the amplitude of the feedback vibrations increased during the application of a specific frequency during a time interval, then increasing the frequency in the same direction along the frequency range will be closer to the resonant frequency of the support material. Similarly, if the amplitude of the feedback vibrations decreased, then moving along the frequency range in the opposite direction will be closer to the resonant frequency. The process will then repeat the measurement of the feedback vibrations from the support material until the resonant frequency of the support material is found.

In addition, the present disclosure broadly describes an apparatus for support material removal that includes a chamber operatively arranged to receive a part having support material, a media placed within the chamber, the media encompassing the part, an ultrasonic transducer arranged to agitate the support material at a resonant frequency and thereby remove the support material from the part, a pump operatively arranged to circulate the media within the chamber, a UFFS operatively arranged within the chamber to detect an amplitude and a frequency of the media and the AMPHSM, and a second UFFS operatively arranged within the chamber to detect the amplitude and the frequency of the media and the AMPHSM.

With that background in mind, it will be apparent that a method of removing support material, may be executed as follows:
 (a) placing a part having support material within a chamber, the chamber having a media arranged within;
 (b) inputting a set of first parameters of the support material into a control unit to determine a first frequency value;
 (c) activating a pump to create flow of the media within the chamber;
 (d) via an ultrasonic transducer, agitating at a first agitation level the media and the part having support material, the part having support material being suspended in the media, and the first agitation level including the first frequency;
 (e) via an ultrasonic frequency feedback sensor, measuring an amplitude at which the support material vibrates corresponding to the first agitation level;
 (f) analyzing the amplitude to determine if the support material is vibrating at a resonant frequency due to the first agitation level;
 (g) if the support material is not vibrating at the resonate frequency from the first agitation level, agitating the media and the part having support material at a second agitation level via the ultrasonic transducer;
 (h) repeating steps (f) through (g) until a resonant agitation level, which vibrates the support material at the resonant frequency, is achieved;
 (i) agitating the media and the part with support material at the resonant frequency until the support material is removed from the part; and,
 (j) removing the part from the chamber after the support material is removed from the part.

In such a method:
 (i) steps (e) through (h) may be repeated over a plurality of time intervals.
 (ii) step (g) may include adjusting an amplitude of the second agitation level in proportion to an amount of support material removed from the part over the time intervals.
 (iii) an amount of energy imparted to the part having support material may be measured during the time intervals, and stored for use in preventing too much removal.
 (iv) the second agitation frequency is emitted at an amplitude that has been selected in proportion to an amount of the support material removed over one or more of the time intervals.

In another method according to the invention, support material is removed by:
 (a) placing a part having support material within a chamber, the chamber having a media arranged within;
 (b) determining a run time value for a duration of flow of the media;

(c) activating a pump to produce a flow of the media within the chamber, whereby the part rotates within the chamber due to the flow of the media;

(d) agitating the media and the part having support material at a first agitation frequency;

(e) via a sensor arranged within the chamber, measuring a first amplitude generated by the support material due to the agitation of the media;

(f) calculating a second agitation frequency based on the first amplitude, wherein the second agitation frequency agitates the media and the support material at a second amplitude, the second frequency being a resonant frequency of the support material;

(g) repeating steps (e) through (f) over a plurality of time intervals, wherein an amount of the support material is removed over each of the time intervals; and, (h) removing the part from the chamber after a desired amount of the support material is removed from the part.

The run time value may be determined using a density, geometry, material, or porosity of the part, the support material, or both.

In such a method:

(i) steps (e) through (h) may be repeated over a plurality of time intervals.

(ii) step (g) may include adjusting an amplitude of the second agitation level in proportion to an amount of support material removed from the part over the time intervals.

(iii) an amount of energy imparted to the part having support material may be measured during the time intervals, and stored for use in preventing too much removal.

(iv) the second agitation frequency is emitted at an amplitude that has been selected in proportion to an amount of the support material removed over one or more of the time intervals.

An apparatus according to the invention my include a chamber operatively arranged to receive a part having support material;

a media placed within the chamber, the media encompassing the part;

an ultrasonic transducer arranged to agitate the support material at a resonant frequency in order to remove the support material from the part within the chamber;

a pump operatively arranged to circulate the media within the chamber;

a first ultrasonic frequency feedback sensor operatively arranged within the chamber to detect ultrasonic energy having an amplitude and a frequency emitted by the part as a result of vibrations imparted to the media; and, a second ultrasonic frequency feedback sensor operatively arranged within the chamber to detect ultrasonic energy having an amplitude and a frequency emitted by the part as a result of vibrations imparted to the media.

In such an apparatus for support material removal may a first detector of the first ultrasonic frequency feedback sensor may be arranged perpendicular to the ultrasonic transducer, and a second detector of the second ultrasonic frequency feedback sensor may be arranged parallel to the ultrasonic transducer.

The present disclosure describes methods and apparatuses for automatically removing support material from parts made using additive manufacturing techniques, and using ultrasonic agitation to remove the support material without damaging the part itself.

Additionally, the present disclosure describes an alternative to avoid or reduce the bottleneck created by manually removing support material and surface finishing of additive manufactured parts.

The invention will become readily apparent upon a review of the following detailed description, in view of the drawings and appended claims.

BRIEF DESCRIPTION OF THE DRAWINGS

The nature and mode of operation of the present invention will be more fully described in the following detailed description of the invention taken with the accompanying figures, in which.

DETAILED DESCRIPTION OF THE INVENTION

At the outset, it should be appreciated that like drawing numbers on different drawing views identify identical, or functionally similar, structural elements of the invention. Furthermore, it is understood that this invention is not limited to the particular methodology, materials, or modifications described and, as such, the invention may vary from that which is disclosed herein. It is also understood that the terminology used herein is for the purpose of describing particular aspects and this invention is not limited to the disclosed aspects.

Unless defined otherwise, all technical and scientific terms used herein have the same meaning as commonly understood to one of ordinary skill in the art to which this invention pertains. It should be understood that any methods, devices or materials similar or equivalent to those described herein can be used in the practice or testing of the method and apparatus.

Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Furthermore, as used herein, "optimization" is intended to mean an act, process, or methodology of making something (such as a design, system, or decision) as fully perfect, functional, or effective as possible. For example, an optimal process will achieve the best results possible from the process under the parameter ranges the process is allowed to operate in. Additionally, as used herein, "determining" is intended to mean the act of receiving information from a sensor and executing an algorithm using a general purpose computer or the like, using that information to produce an output.

Figure 1:
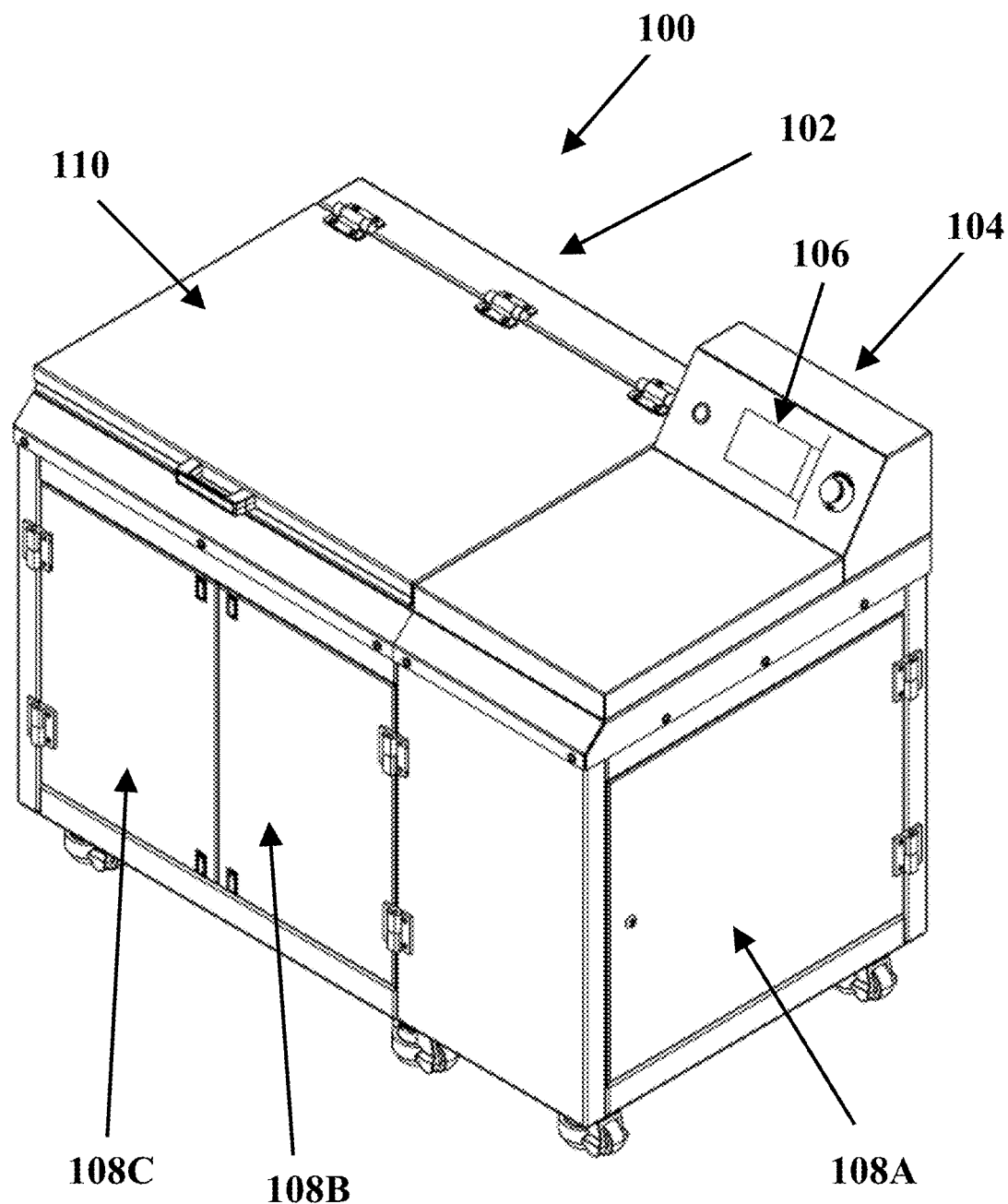
FIG. 1 is a perspective view of a support material removal apparatus.
Figure 2:
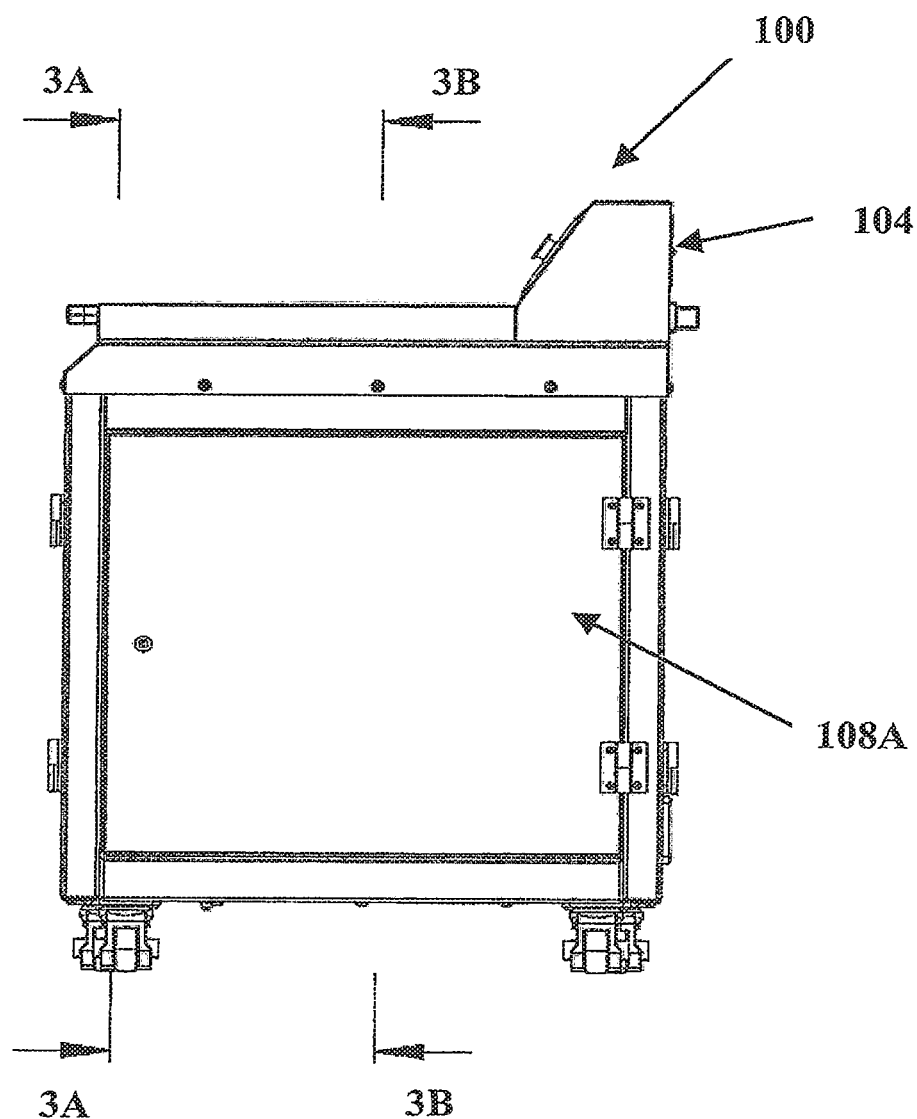
FIG. 2 is a side view of the support material removal apparatus depicted in FIG. 1.

Adverting now to the figures, FIG. 1 is a perspective view of support material removal apparatus 100 (the "SMRA 100"). SMRA 100 broadly includes chamber section 102, control unit section 104, control input screen 106, access doors 108A, 108B, and 108C, and lid 110. Chamber section 102 encapsulates chamber 120 (shown in FIG. 3A). Control unit section 104 contains control unit 140 (shown in FIG. 3A). Control input screen 106 is positioned so a user can input certain operation parameters for SMRA 100.

Figure 3A:
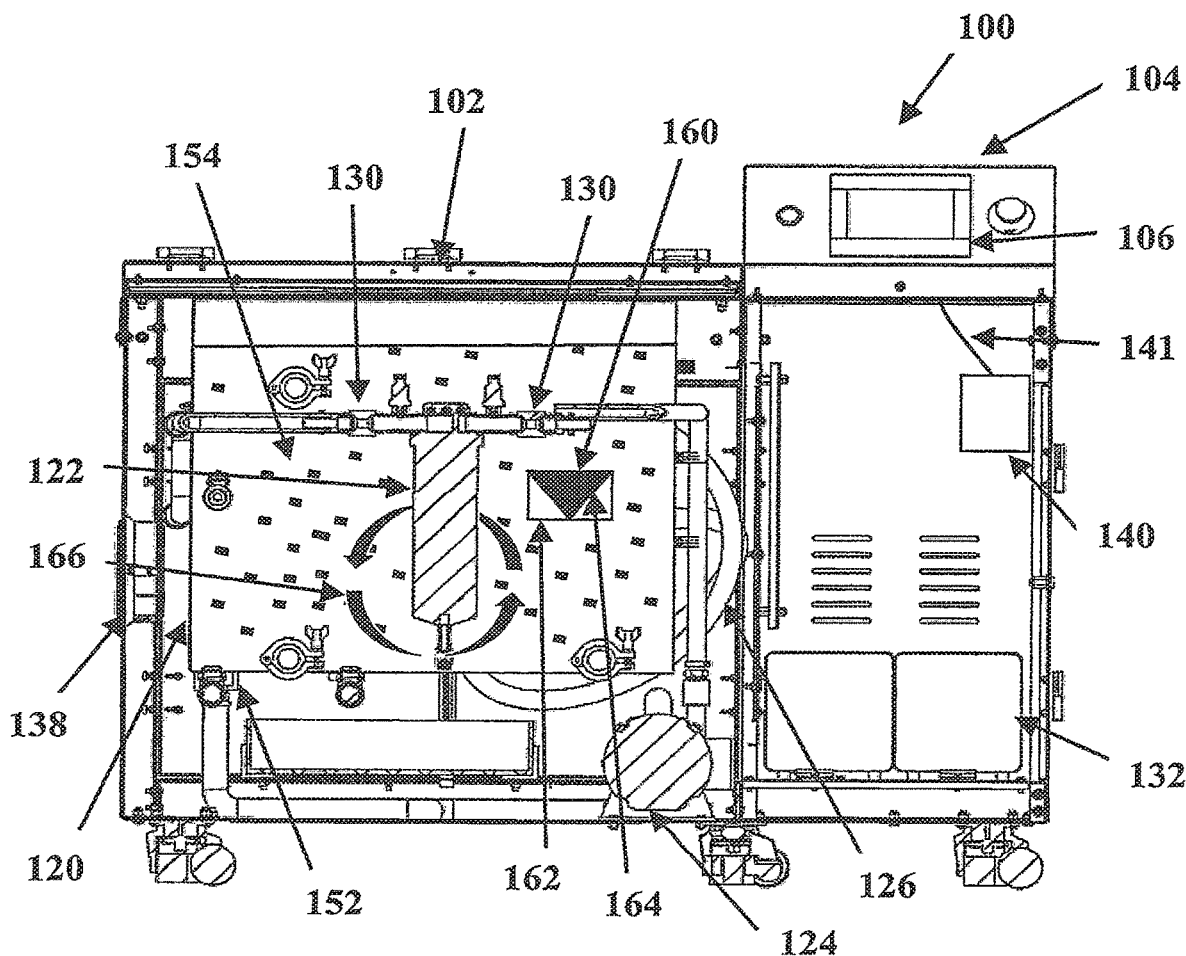
FIG. 3A is a cross-sectional view of the support material removal apparatus taken generally along line 3A-3A in FIG. 2.
Figure 3B:
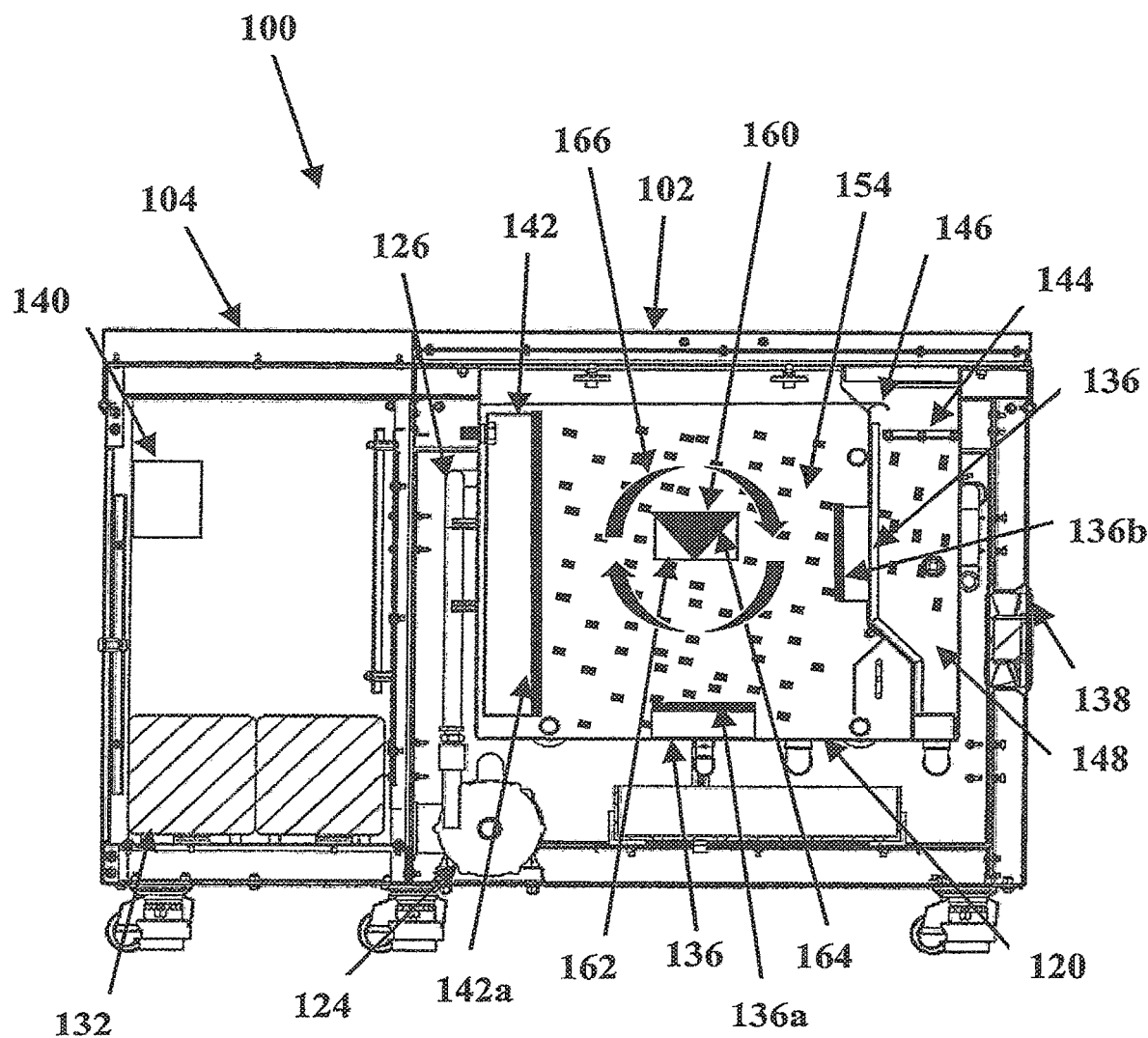
FIG. 3B is a cross-sectional view of the support material removal apparatus taken generally along line 3B-3B in FIG. 2.

With reference to FIGS. 3A and 3B, chamber 120 may be arranged within chamber section 102. Also arranged within chamber section 102 may be filter 122, pump 124, pressure sensors 130, UFCS sensors 136, temperature unit 138, ultrasonic transducer 142 (shown in FIG. 3B), and temperature sensor 152. Media 154 is operatively arranged within chamber 120. Media 154 can be a fluid, such as a liquid detergent or water, or a plurality of abrasive bodies. Pump 124 may be in fluid communication with the chamber 120 via pipes 126, which secure to chamber 120 at positions around the perimeter of chamber 120. Via the pipes 126 the pump 124 takes media 154 from chamber 120 and push that media 154 back to the chamber 120 and thereby create a vortex flow within chamber 120 during operation. This vortex allows for an even and complete mixing of parts 160, which have support material 162 that must be removed. It is desirable to have parts 160 evenly and completely circulated through chamber 120 to ensure an even support material removal and/or surface finish. Feedback sensors 136 are operatively arranged within chamber 120 and measure the amplitude and frequency at which part 160 and support material 162 are vibrating while ultrasonic transducer 142 is agitating media 154 at a first agitation level. Multiple feedback sensors 136 can be used to better measure the frequency and amplitude of the vibrating AMPHSM 160, 162. Feedback sensors 136 each include a detector which may be mounted near an exterior surface of the sensor 136. In an embodiment of the invention, a detector 136a of first sensor 136 may be arranged in chamber 120 perpendicular to emitter 142a of ultrasonic transducer 142, and a detector 136b of second sensor 136 may be arranged in chamber 120 parallel to emitter 142a of ultrasonic transducer 142. Emitter 142a is a mechanical output for ultrasonic transducer 142, which converts electrical signals into mechanical waves in the media 154. Detectors 136a and 136b are mechanical inputs for sensors 136 which are used to detect mechanical wave energy in a fluid. As mechanical wave energy is imparted to detectors 136a and 136b, this movement is converted into a readable electric signal which may be amplified and sent to a computer. However, the arrangement of sensors 136 can be any suitable arrangement to properly detect feedback vibrations from support material 162. The sensors 136 may be ultrasonic frequency feedback sensors (UFFS) or cavitation sensors. However, it should be appreciated that sensors 136 can be any suitable sensors which can detect the frequency and/or vibration amplitude of part 160 or support material 162.

Rotation of part 160 within media vortex 166 creates friction between media 154 and part 160, and between media 154 and support material 162, thereby causing removal of the support material 162. Removal of the support material 162 may be enhanced by ultrasonic transducers 142 placed in the tank and oriented tangentially to the rotating object. The vibrating media 142 creates, which may enhance removal of support material 162, while also causing cavitation through direct interaction with rotating AMPHSM 160, 162. A controlled agitation is generated since AMPHSM 160, 162 generally circulates around a central point in chamber 120. As part AMPHSM 160, 162 circulates within media vortex 166, the part 160 and support material 162 are exposed to ultrasonic waves that have been emitted from ultrasonic transducer 142. The substantially horizontal arrangement of media vortex 166 (shown in FIG. 3B), along with the tangential placement of both ultrasonic transducer 142 and sensors 136 which may be affixed or mounted to walls of chamber 120, creates greater tangential forces applied to support material 162 thereby increasing the efficiency of the process when compared to other processes which do not utilize tangential arrangement of any agitation means and media circulation.

Temperature unit 138 may be a heating or cooling device, and may include a fan. The temperature unit 138 can be used to cool or heat media 154 within chamber 120 during operation of apparatus 100. Pressure sensors 130 may be arranged within chamber 120 to detect the flow pressure imparted on media 154 by pump 124.

Arranged within control unit section 104 of apparatus 100 may be control input screen 106, control unit 140, and ultrasonic wave generators 132. Control input screen 106 may be electrically communicatively connected to control unit 140 via wire 141. Control unit 140 may be electrically communicatively connected to pump 124, pressure sensors 130, sensors 136, temperature unit 138, ultrasonic wave generators 132, and temperature sensor 152.

Support material 162 comprises print material which is not a component of the final desired part 160. This can include support scaffolding encompassing part 160. The vibration caused by ultrasonic transducer 142 can be intended to vibrate all support material 162 or merely the joining sections 164 which are arranged between part 160 and support material 162, or both. In this document, the phrase "joining section 164" generally refers to the material arranged between part 160 and support material 162.

FIG. 3B illustrates that ultrasonic transducer 142 may be mounted to an inside surface of chamber 120 in order to agitate media 154. The arrangement of ultrasonic transducer 142 within chamber 120 places ultrasonic transducer 142 in direct contact with media 154 once media 154 is placed within the chamber 120. It should be appreciated however, that ultrasonic transducer 142 can be substituted with any ultrasonic agitator in order to agitate media 154. Contained within chamber 120 is overflow chamber 148. Overflow chamber 148 is arranged to allow media 154 to cycle through pump 124 without having part 160 becoming lodged within pipes 126. Media vortex 166 keeps part 160 circulating generally near the center of chamber 120, while only the very top layer of media 154 can flow over weir 146 into overflow chamber 148. Media 154 flows over weir 146 into overflow chamber 148. As media 154 flows over weir 146, media 154 may pass through filtering screen 144, which filters out larger pieces of part 160 or support material 162 which may have broken off during the support removal process.

Figure 4:
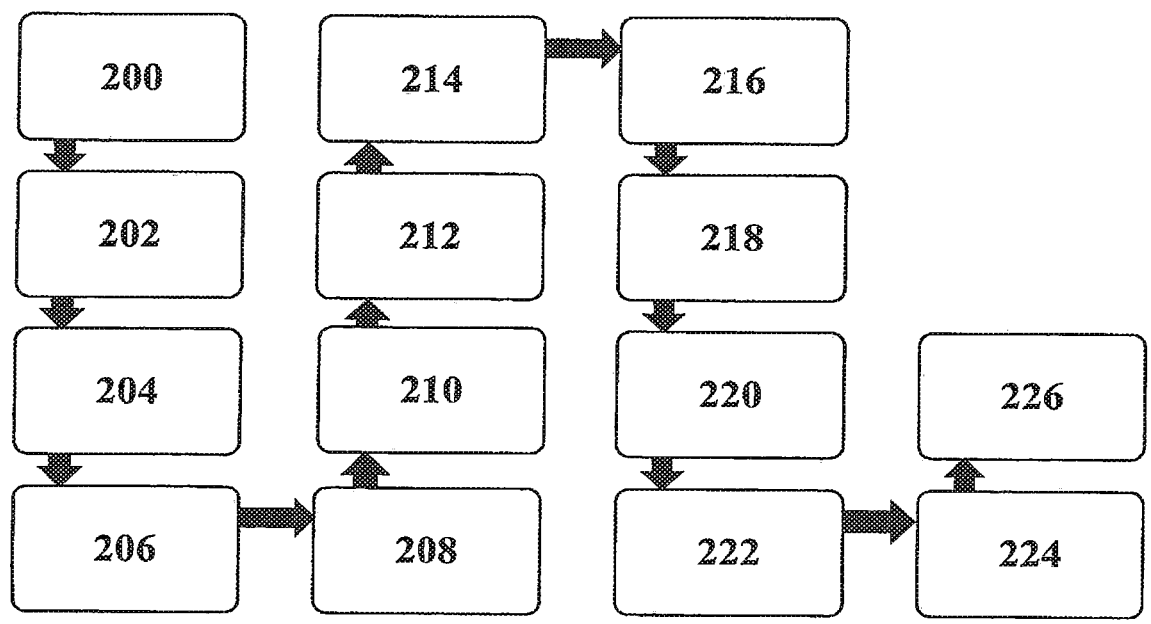
FIG. 4 is a flowchart describing optimization of the support material removal method according to a first embodiment of the present invention; and, FIG. 5 is a flowchart describing optimization of the support material removal method according to a second embodiment of the present invention.

FIG. 4 is a flowchart describing optimization of a support material removal method according to a first embodiment of the invention. Step 200 includes placing AMPHSM 160, 162 within chamber 120, and the chamber 120 has media 154 arranged within. Step 202 includes inputting a first density, geometry, material, and/or porosity of support material 162 into control unit 140. Step 204 includes measuring a set of parameters of media 154, which may include measuring temperature (via sensor 152), pH, fluid flow, agitation level, and/or pressure (via sensor 130). Step 206 includes activating pump 124 to create media vortex 166 within chamber 120. Step 208 includes agitating media 154 and AMPHSM 160, 162, which are in media 154, at a first agitation level via ultrasonic transducer 142. Step 210 incudes measuring an amplitude at which part 160 and support material 162 vibrate as a result of the first agitation level. Step 210 may be executed with the assistance of ultrasonic frequency feedback sensor (UFFS) 136. Step 212 includes determining whether the amplitude measured in step 210 indicates the support material 162 is vibrating at a resonant frequency due to the first agitation level. If the measured amplitude indicates that the vibration is not at the resonant frequency, then in step 214 the media 154 and AMPHSM 160, 162 are agitated at a second agitation level via ultrasonic transducer 142. Step 216 includes measuring the amplitude at which part 160 and support material 162 vibrate in response to the first and second agitation level. Step 218 includes increasing or decreasing an amplitude of the second agitation level compared to the first agitation level in proportion to an amount of support material 162 removed from part 160 over a first time interval. Step 220 includes repeating steps 210 through steps 216 until a resonant agitation level which vibrates support material 162 at resonant frequency is determined. Step 222 includes agitating media 154 and AMPHSM 160, 162 suspended in media 154 at the resonant agitation level until a desired amount of support material 162 is removed from part 160. Step 224 includes measuring a total amount of energy that the AMPHSM 160, 162 is subject to over consecutive time intervals to ensure part 160 will not have excessive energy applied to part 160, and thereby avoid destroying part 160 while removing support material 162. Step 226 includes removing part 160 from chamber 120 after support material 162 is removed from part 160.

Figure 5:
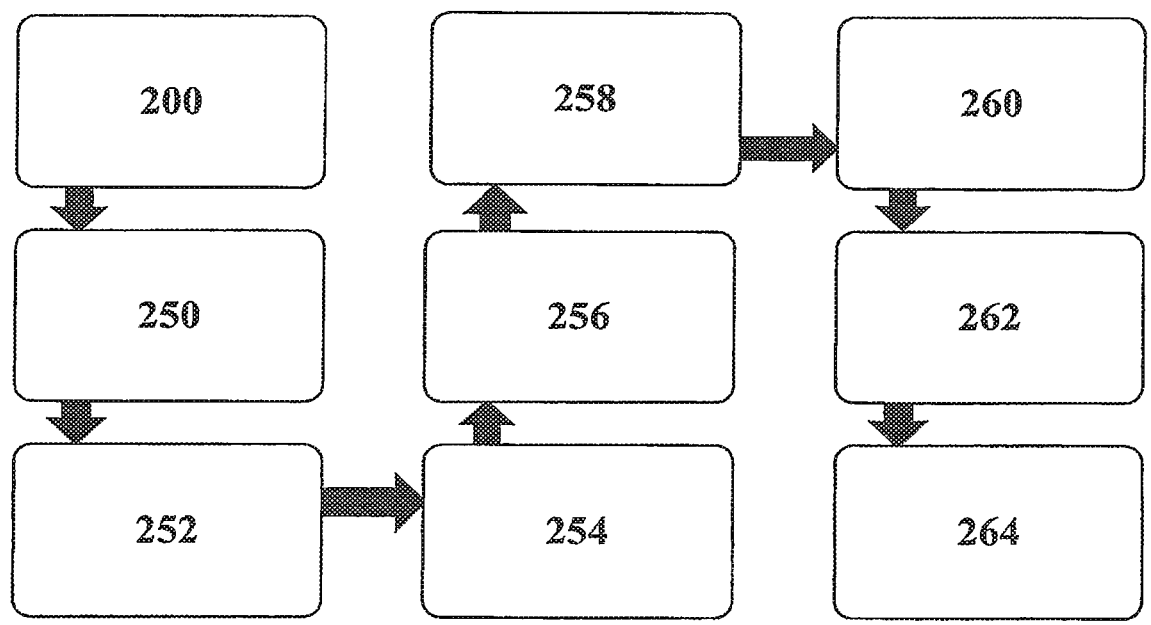

FIG. 5 is a flowchart describing optimization of the support material removal method according to a second embodiment of the invention. Step 200 includes placing the AMPHSM 160, 162 within chamber 120, and the chamber 120 has media 154 arranged within. Step 250 includes generating a run time value ("RTV") for a duration of media vortex 166, which is generated by pump 124 circulating media 154. Step 252 includes entering the density, geometry, material, or porosity of part 160, support material 162, or both to determine an initial frequency value. The initial frequency value may be determined from a density, geometry, material, or porosity of part 160, support material 162, or both. The initial frequency value may be determined by analyzing the above parameters of the part to determine specific properties of support material 162, such as wall thickness and density, to better settle on an initial frequency value. For example, if support material 162 is solid, the initial frequency value might be set at a much higher frequency than compared to support material 162 that is not solid. Step 254 includes activating pump 124 in order to circulate media 154 via the chamber 120, which creates media vortex 166 and causes part 160 to rotate within chamber 120. Step 256 includes agitating media 154 and AMPHSM 160, 162 at a first frequency that is set at the initial frequency value. Step 258 includes measuring a first amplitude of the vibrations generated by AMPHSM 160, 162 due to the agitation of media 154. Sensors 136 may be used to make the measurements of step 258. Step 260 includes calculating a second frequency based on the measurement of the first amplitude (step 258), and then applying the second frequency to agitates media 154 and the AMPHSM 160, 162 at a second amplitude. The second frequency may be a resonant frequency of support material 162. The vibrations of AMPHSM 160, 162 have both an amplitude and frequency.

In order to determine if the support material is vibrating at a resonant frequency, sensors 136 read in the amplitude and frequency of support material 162 which is vibrating within media 154. If support material 162 is vibrating at resonant frequency, the amplitude of the vibration from support material 162 will increase without changing the frequency applied to support material 162 from ultrasonic transducer 142. If the feedback vibrations of support material 162 are not increasing in amplitude, then the frequency of the waves emitted by the ultrasonic transducer 142 may be altered to increase or decrease the emitted frequency. If the amplitude of the feedback vibrations increased, then the frequency is increased in the same direction along the frequency range. Similarly, if the amplitude of the feedback vibrations decreased, then the frequency is decreased along the frequency range in the opposite direction. Step 262 includes repeating step 256 and step 258 over a plurality of time intervals, where an amount of support material 162 is removed over each consecutive time interval. In this manner, changes in the resonant frequency caused by the removal of a portion of support material 162 can be taken into account. Step 264 includes removing part 160 from chamber 120 after a desired amount of support material 162 is removed from part 160. This process is able to be performed since part 160 has a first density, geometry, material, or porosity and support material 162 has a second density, geometry, material, or porosity, wherein the first density, geometry, material, or porosity has a first resonant frequency and the second density, geometry, material, or porosity has a second resonant frequency, the first resonant frequency being different than the second resonant frequency.

Example embodiments of the invention are described in the foregoing description, which includes the drawings. The description is accordingly to be regarded in an illustrative rather than a restrictive sense.

It will be appreciated that various aspects of the above-disclosed invention and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS 100 support material removal apparatus
102 chamber section
104 control unit section
106 control input screen
108A access door
108B access door
108C access door
110 lid
120 chamber
121 opening
122 filter
124 pump
126 pipes 130 pressure sensor
136 sensor
136a detector
136b detector
138 temperature unit
142 ultrasonic transducer
142a emitter
144 filtering screen
146 weir
148 overflow chamber
152 temperature sensor
154 media
160 part
162 support material
164 joining section
166 media vortex
200 placement step
202 parameter input step
204 parameter measurement step
206 pump activation step
208 media agitation step
210 frequency measurement step
212 frequency analyzation step
214 media agitation step
216 amplitude measurement step
218 amplitude adjustment step
220 repetition step
222 media agitation step
224 energy measurement step
226 removal step
250 run time value generation step
252 parameter input step
254 pump activation step
256 media agitation step
258 frequency measurement step
260 frequency calculation step
262 repetition step
264 removal step

What is claimed is:

1. An apparatus for support material removal, comprising:
a chamber operatively arranged to receive a part having support material;
a media placed within said chamber, said media encompassing said part;
an ultrasonic transducer arranged to agitate said support material at a resonant frequency in order to remove said support material from said part within said chamber;
a pump operatively arranged to circulate said media within said chamber;
a first ultrasonic frequency feedback sensor operatively arranged within said chamber to detect ultrasonic energy having an amplitude and a frequency emitted by said part as a result of vibrations imparted to said media; and,
a second ultrasonic frequency feedback sensor operatively arranged within said chamber to detect ultrasonic energy having an amplitude and a frequency emitted by said part as a result of vibrations imparted to said media.

2. The apparatus for support material removal as recited in claim 1, wherein a first detector of said first ultrasonic frequency feedback sensor is arranged perpendicular to said ultrasonic transducer, and a second detector of said second ultrasonic frequency feedback sensor is arranged parallel to said ultrasonic transducer.

3. The apparatus for support material removal as recited in claim 1, wherein said media includes a liquid detergent.

4. An apparatus for support material removal, comprising:
a chamber operatively arranged to receive a part having support material and media encompassing the part;
an ultrasonic transducer arranged to agitate the support material at a frequency in order to remove the support material from the part when the part is in the chamber;
a pump operatively arranged to circulate the media when the media is in the chamber; and
a first ultrasonic frequency feedback sensor operatively arranged within the chamber to detect an amplitude and a frequency emitted by the part as a result of the agitation imparted by the ultrasonic transducer.

5. The apparatus of claim 4, further wherein the ultrasonic transducer is able to agitate the support material at a resonant frequency of the support material.

6. The apparatus of claim 4, further comprising a second ultrasonic frequency feedback sensor operatively arranged within the chamber to detect an amplitude and a frequency emitted by the part as a result of the agitation imparted by the ultrasonic transducer.

7. The apparatus of claim 4, wherein a first detector of the first ultrasonic frequency feedback sensor is arranged perpendicular to the ultrasonic transducer, and a second detector of the second ultrasonic frequency feedback sensor is arranged parallel to the ultrasonic transducer.

8. The apparatus of claim 4, wherein the media includes a liquid detergent.

9. An apparatus for removing unwanted support material from an additively manufactured part, comprising:
a chamber for containing a media in which the additively manufactured part is placed;
an ultrasonic transducer located with respect to the chamber for applying ultrasonic energy to the media and the additively manufactured part therein;
a first sensor located to measure a response to the ultrasonic energy applied to at least one of the media and the additively manufactured part and provide a first output indicative thereof; and
a control unit operably connected to the ultrasonic transducer and the first sensor, said control unit adapted to receive the first output from the first sensor and based on said first output adjust the ultrasonic energy applied by the ultrasonic transducer.

10. The apparatus of claim 9 further comprising:
a second sensor located to measure a response to the ultrasonic energy applied to at least one of the media and the additively manufactured part and provide a second output indicative thereof, said second sensor connected to the control unit and operable to provide said second output thereto.

11. The apparatus of claim 10 wherein the control unit is operable to adjust the ultrasonic energy applied by the ultrasonic transducer based on said second output.

12. The apparatus of claim 10 wherein said first sensor is arranged perpendicularly to the second sensor.

13. The apparatus of claim 9 wherein said first sensor is arranged perpendicularly to the ultrasonic transducer.

14. The apparatus of claim 9 wherein said first sensor is one of an ultrasonic feedback sensor and a cavitation sensor.

15. The apparatus of claim 9 wherein said first sensor is operable to detect at least one of frequency vibration and amplitude vibration of at least one of the additively manufactured part and the unwanted support material.

16. The apparatus of claim 9 wherein said first sensor is located on a wall of the chamber.

17. The apparatus of claim 9 further comprising:
a temperature unit associated with the chamber and operable to heat or cool the media contained in the chamber.

18. The apparatus of claim 9 further comprising:
a pump associated with the chamber and operable to circulate the media contained in the chamber.

19. The apparatus of claim 9 wherein the media comprises at least one of: a fluid, a liquid detergent, water, and a plurality of abrasive bodies.

20. The apparatus of claim 9 further comprising:
a control input screen connected to the control unit and operable to allow a user to input operation parameters.

* * * * *